United States Patent
Kim et al.

(10) Patent No.: US 12,032,821 B2
(45) Date of Patent: *Jul. 9, 2024

(54) METHOD AND APPARATUS FOR PROVIDING TACTILE MESSAGE

(71) Applicant: CK MATERIALS LAB CO., LTD., Seoul (KR)

(72) Inventors: Hyeong Jun Kim, Seoul (KR); Jong Hun Lee, Seoul (KR); Nam Seok Kim, Seoul (KR); Jeong Bum Lee, Seoul (KR)

(73) Assignee: CK MATERIALS LAB CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/580,636

(22) Filed: Jan. 20, 2022

(65) Prior Publication Data

US 2022/0137809 A1    May 5, 2022

Related U.S. Application Data

(60) Continuation of application No. 17/096,343, filed on Nov. 12, 2020, which is a division of application No. (Continued)

(30) Foreign Application Priority Data

Apr. 21, 2016  (KR) .................. 10-2016-0048879
May 30, 2016  (KR) .................. 10-2016-0066327

(51) Int. Cl.
*H04W 4/14*  (2009.01)
*G06F 1/16*  (2006.01)
(Continued)

(52) U.S. Cl.
CPC ........ *G06F 3/04883* (2013.01); *G06F 1/1626* (2013.01); *G06F 1/163* (2013.01);
(Continued)

(58) Field of Classification Search
CPC ...... G06F 3/04883; G06F 3/016; G06F 3/017; G06F 3/046; H04W 4/14
See application file for complete search history.

(56) References Cited

U.S. PATENT DOCUMENTS 7,159,008 B1    1/2007  Wies et al.
8,849,846 B1 *  9/2014  Wang .................. G06F 16/23
                                                        707/766

(Continued)

FOREIGN PATENT DOCUMENTS

JP    2011-528537 A    11/2011
KR    20110041065 A    4/2011
(Continued)

OTHER PUBLICATIONS

Kathryn Whitenton, "Overuse of Overlays: How to Avoid Misusing Lightboxes", published on May 25, 2015 to https://www.nngroup.com/articles/overuse-of-overlays, retrieved Jun. 11, 2023. (Year: 2015).*

(Continued)

*Primary Examiner* — Shourjo Dasgupta
(74) *Attorney, Agent, or Firm* — NKL Law; Jae Youn Kim

(57) ABSTRACT

The present invention relates to a tactile message providing method and a tactile message providing device. The tactile message providing method in a mobile device includes driving a tactile message program in a first mobile device, receiving a tactile pattern in the first mobile device, converting the tactile pattern into a tactile signal, and transmitting the tactile signal to a second mobile device. The tactile (Continued)

message program includes a tactile switch icon, and the tactile switch icon switches a text input window to a tactile pattern input window and the tactile pattern input window receives the tactile pattern to generate a digital signal.

17 Claims, 18 Drawing Sheets

Related U.S. Application Data

16/094,904, filed as application No. PCT/KR2017/003163 on Mar. 24, 2017, now Pat. No. 10,860,204.

(51) Int. Cl.
*G06F 3/01* (2006.01)
*G06F 3/041* (2006.01)
*G06F 3/046* (2006.01)
*G06F 3/04883* (2022.01)

(52) U.S. Cl.
CPC .............. *G06F 3/016* (2013.01); *G06F 3/017* (2013.01); *G06F 3/0416* (2013.01); *G06F 3/046* (2013.01); *G06F 2203/014* (2013.01); *H04W 4/14* (2013.01)

(56) References Cited

U.S. PATENT DOCUMENTS

| | | | |
|---|---|---|---|
| 9,235,278 | B1 | 1/2016 | Cheng et al. |
| 9,251,540 | B1* | 2/2016 | Magee ................ G07F 19/206 |
| 9,607,491 | B1 | 3/2017 | Mortimer et al. |
| 9,678,570 | B2 | 6/2017 | Hong et al. |
| 2010/0053094 | A1 | 3/2010 | Kong et al. |
| 2010/0053116 | A1* | 3/2010 | Daverman .......... G06F 3/04144 |
| | | | 345/175 |
| 2010/0123724 | A1 | 5/2010 | Moore et al. |
| 2010/0141604 | A1* | 6/2010 | Cai ...................... G06F 3/045 |
| | | | 345/174 |
| 2010/0194703 | A1 | 8/2010 | Fedor et al. |
| 2010/0210323 | A1 | 8/2010 | Collins et al. |
| 2010/0231541 | A1 | 9/2010 | Cruz-Hernandez et al. |
| 2011/0053577 | A1 | 3/2011 | Lee et al. |
| 2011/0061017 | A1 | 3/2011 | Ullrich et al. |
| 2012/0193211 | A1* | 8/2012 | Ciesla .................. G06F 3/0202 |
| | | | 200/81 H |
| 2013/0016042 | A1 | 1/2013 | Makinen et al. |
| 2013/0016129 | A1 | 1/2013 | Gossweiler, III et al. |
| 2013/0227411 | A1 | 8/2013 | Das et al. |
| 2014/0040365 | A1 | 2/2014 | Carter et al. |
| 2014/0059449 | A1 | 2/2014 | Kim et al. |
| 2014/0143682 | A1 | 5/2014 | Druck |
| 2014/0160054 | A1 | 6/2014 | Rabii et al. |
| 2014/0210758 | A1 | 7/2014 | Park et al. |
| 2014/0215336 | A1 | 7/2014 | Gärdenfors et al. |
| 2014/0225857 | A1 | 8/2014 | Ma |
| 2014/0344741 | A1* | 11/2014 | Newman ............. G06F 3/04842 |
| | | | 715/771 |
| 2015/0072738 | A1 | 3/2015 | Mankowski |
| 2015/0097786 | A1 | 4/2015 | Behles et al. |
| 2016/0062636 | A1* | 3/2016 | Jung ................... G06F 3/04817 |
| | | | 715/762 |
| 2016/0063828 | A1 | 3/2016 | Moussette et al. |
| 2016/0078659 | A1* | 3/2016 | Bartkiewicz .......... G06F 3/0482 |
| | | | 715/771 |
| 2016/0139671 | A1 | 5/2016 | Jun et al. |
| 2016/0162098 | A1 | 6/2016 | Kim et al. |
| 2016/0162143 | A1 | 6/2016 | Ito |
| 2016/0313840 | A1 | 10/2016 | Rihn et al. |
| 2017/0289337 | A1* | 10/2017 | Wang ................ H04M 1/72436 |

FOREIGN PATENT DOCUMENTS

| | | |
|---|---|---|
| KR | 20130064806 A | 6/2013 |
| KR | 10-2014-0004510 A | 1/2014 |
| KR | 10-1595742 B1 | 2/2016 |
| KR | 10-2016-0040062 A | 4/2016 |

OTHER PUBLICATIONS

"Responsive UI", published on Dec. 9, 2015 to https://m1.material.io/layout/responsive-ui.html#, retrieved Jun. 11, 2023. (Year: 2015).*
"User Interface Design Basics", published on Jul. 2, 2013 to https://www.usability.gov/what-and-why/user-interface-design.html, retrieved Jun. 11, 2023. (Year: 2013).*
Kathryn Whitenton, "Menu Design: Checklist of 15 UX Guidelines to Help Users", published on Nov. 29, 2015 to https://www.nngroup.com/articles/menu-design, retrieved Jun. 11, 2023. (Year: 2015).*

* cited by examiner

LINES OF MAGNETIC FLUX

FIG. 7
141
(a)
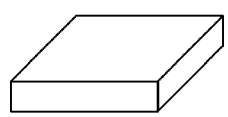
(b)
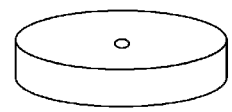
(c)
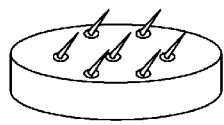
(d)
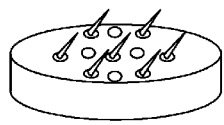
(e)
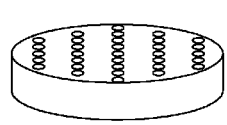
(f)
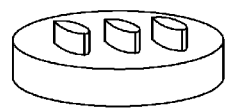
(g)
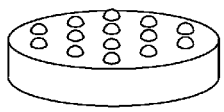
(h)

FIG. 8
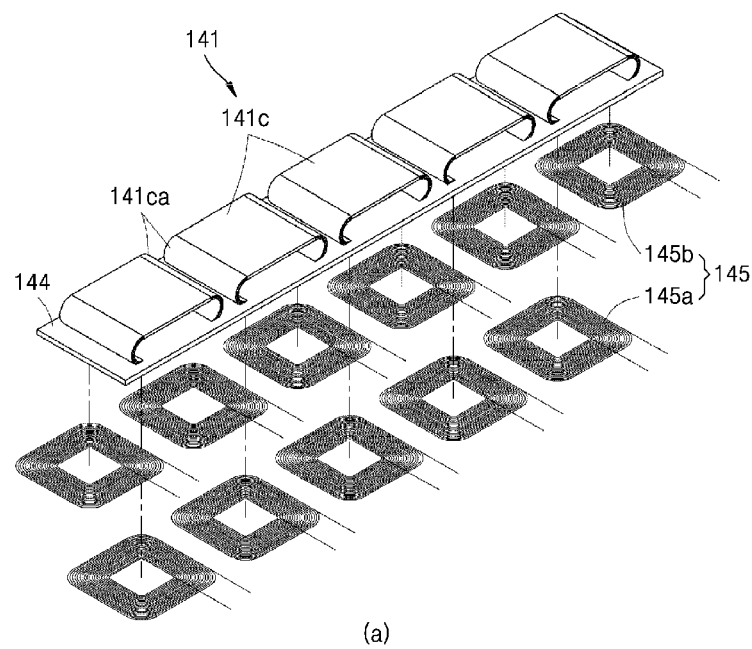
(a)
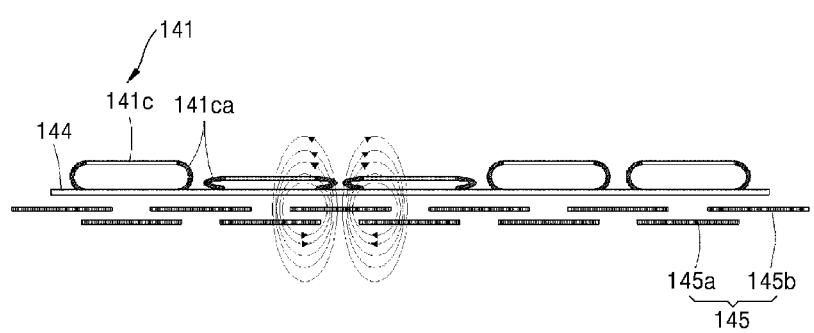
(b)

FIG. 9
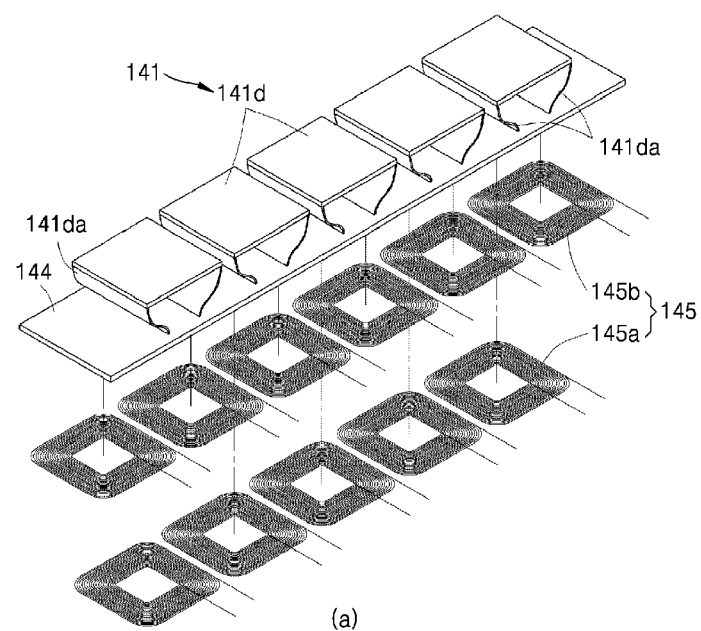
(a)
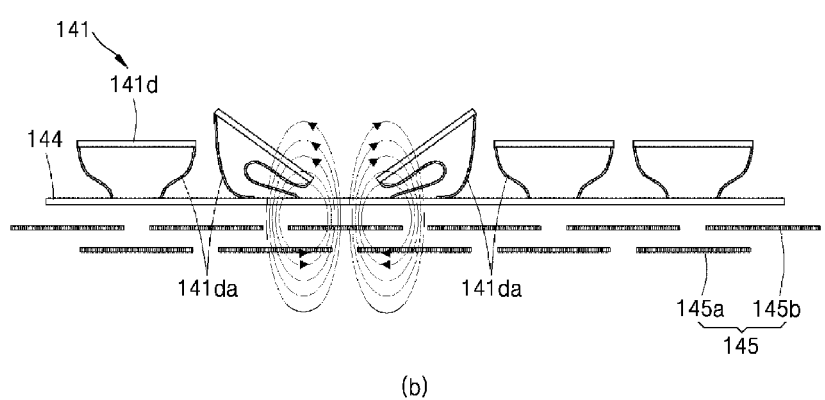
(b)

(a)  (b)

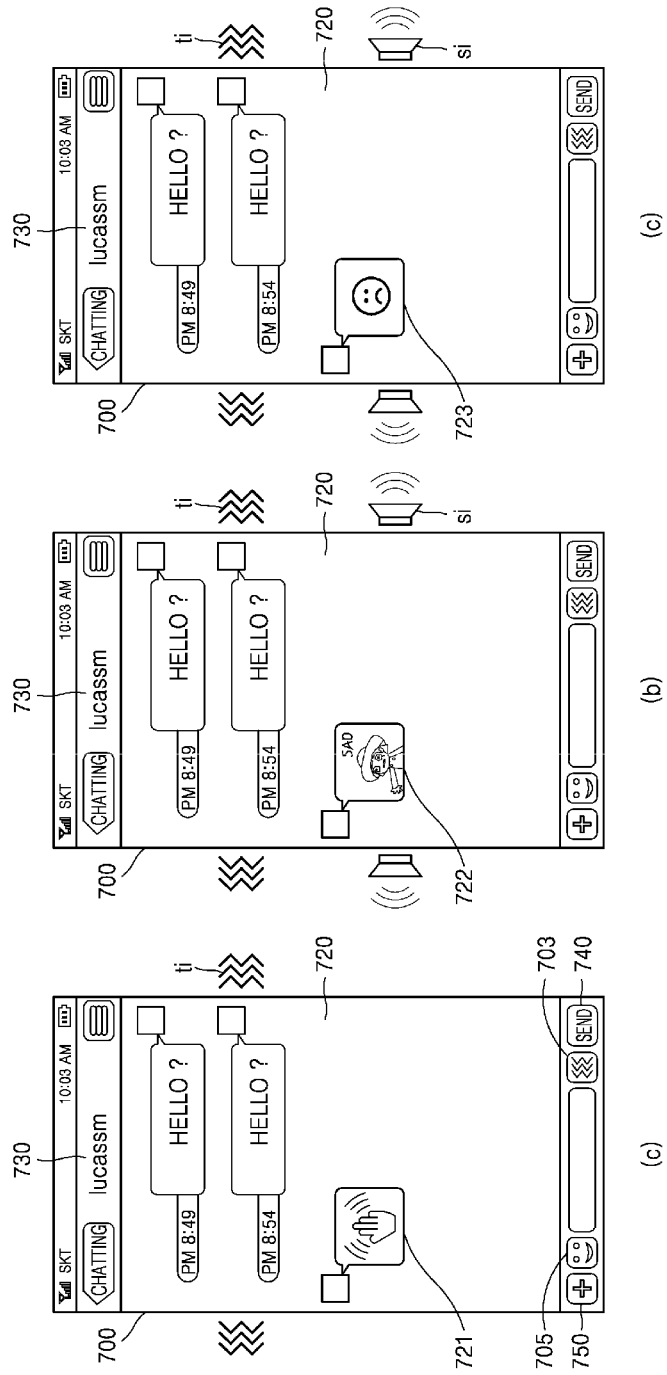

METHOD AND APPARATUS FOR PROVIDING TACTILE MESSAGE

CROSS-REFERENCE TO RELATED APPLICATIONS

This application is a Continuation of U.S. application Ser. No. 17/096,343, filed Nov. 12, 2020, which is a Division of U.S. application Ser. No. 16/094,904, filed Oct. 19, 2018, which claims priority of International Patent Application No. PCT/KR2017/003163, filed on Mar. 24, 2017, which claims priority of Korean Patent Applications No. KR 10-2016-0048879, filed on Apr. 21, 2016 and KR 10-2016-0066327, filed on May 30, 2016, the disclosures of which are incorporated by reference in their entirety.

TECHNICAL FIELD

The present invention relates to a tactile message providing method and a tactile message providing device. More particularly, the present invention relates to a tactile message providing method and a tactile message providing device that may provide tactile information to a counterpart in real time by a user inputting a tactile pattern or selecting a previously stored tactile pattern.

BACKGROUND ART

As the supply rate of the wireless communication terminal increases, it becomes a necessity of life of modern people and is developed as a wearable type device which may be worn by the user in the existing handheld type.

Also, in terms of communication services, it evolves from existing voice calls and short messages and evolves toward providing multimedia services including various data transmission and various additional services.

Short Message Service (SMS) among existing communication services using a wireless communication terminal allows the user to conveniently contact and communicate with each other in real time, but has limitations in transmitting the emotion or feeling of the user. To overcome this, a multimedia message service (MMS) and a messenger service (Messenger Service), including pictures, videos, and emoticons, are used. However, most of these tools are also visual, so that it has limitations in conveying rich emotions and feelings of users.

In addition, the service providing the conventional tactile sense is mostly limited to the vibration, and there is a problem that it is monotonous because it may not give direction to the tactile sense. In addition, since each tactile feedback pre-stored in the memory unit is read and transmitted, it is not sufficient to transmit a tactile sense reflecting user's emotions or emotions in real time.

DISCLOSURE OF THE INVENTION

Technical Problem

The present invention provides a tactile message providing method and a tactile message providing method through which as the tactile sense is transmitted, the limited user's expression through the existing message service relying primarily on visual perception is avoided and the emotions that users feel in various situations allow other person to feel the same way.

The present invention also provides a tactile message providing method and a tactile message providing device that transmit various tactile feelings such as vibration, squeeze, tightening, hitting, pushing, tapping, or tilting more sensitively to a receiver by promptly inputting a feeling of a sender in a tactile pattern.

Technical Solution

Embodiments of the present invention provide a tactile message providing method for a tactile sense in a mobile communication terminal device, the method including: (a) driving a tactile message program; (b) receiving a tactile pattern; (c) converting the tactile pattern into a pattern signal; and (d) transmitting the pattern signal to a reception terminal device, wherein the tactile message program includes a tactile pattern input window or a tactile switch icon for switching a text input window to a tactile pattern input window, wherein the pattern signal is a signal capable of transmitting tactile information by operating a tactile delivery unit of the reception terminal device.

In other embodiments of the present invention, a tactile message providing device for transmitting a tactile sense includes: a display unit for displaying a tactile message program having a tactile pattern input window or a tactile switch icon for switching a text input window to a tactile pattern input window; an input unit for receiving a tactile pattern from the tactile pattern input window; a control unit for detecting a pattern signal of the tactile pattern; a communication unit for transmitting the pattern signal to a reception terminal device; and a tactile delivery unit for transmitting tactile information, wherein the pattern signal is a signal capable of transmitting tactile information by operating a tactile delivery unit of the reception terminal device.

Advantageous Effects

According to the present invention configured as described above, as the tactile sense is transmitted, the existing message service relying primarily on visual perception is avoided and the emotions that users feel in various situations allow other person to feel the same way.

In addition, according to the present invention, as promptly inputting a feeling of a sender in a tactile pattern, various tactile feelings such as vibration, squeeze, tightening, hitting, pushing, tapping, or tilting are more sensitively transmitted to a receiver.

BRIEF DESCRIPTION OF THE DRAWINGS

FIG. 7 is a view showing various shapes of a tactile delivery unit according to an embodiment of the present invention.

FIG. 8 is a view showing a tactile delivery unit according to the third embodiment of the present invention.

FIG. 9 is a view showing a tactile delivery unit according to the fourth embodiment of the present invention.

FIG. 23 is a view showing a screen for receiving a tactile message according to an embodiment of the present invention.

DESCRIPTION OF REFERENCE NUMERALS

Figure 1:
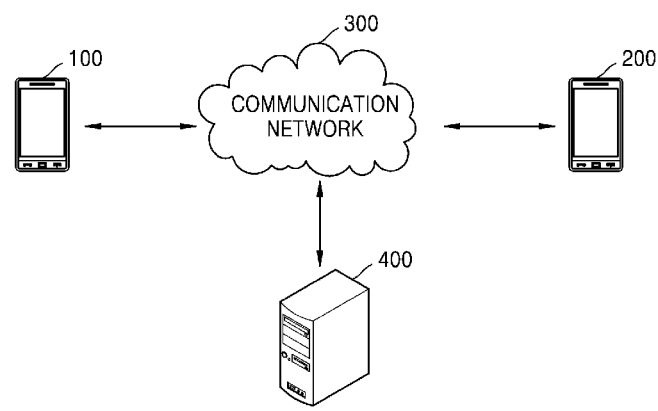
FIG. 1 is a view schematically showing a configuration of an overall system for providing a tactile message according to an embodiment of the present invention.

100: transmission terminal device
110: input unit
120: display unit
130: memory unit
140: tactile delivery unit
141: tactile unit
145: magnetic field generation unit
150: content delivery unit
160: communication unit
170: control unit
200: reception terminal device
300: communication network
400: server
500, 600, 700: screens of a tactile message program
510, 601, 710: input windows for inputting tactile patterns
703: tactile switch icon
705: emoticon input icon
706: tactile emoticon
707: user emoticon
711, 715: virtual region
720: dialog window
721, 722, 723: tactile message
S: symbol

MODE FOR CARRYING OUT THE INVENTION

Reference is made to the accompanying drawings shown as examples of the embodiments. These embodiments are described in detail to allow those skilled in the art to practice the present invention. It should be understood that the various embodiments of the present invention are different, but need not be mutually exclusive. For example, specific forms, structures, and characteristics described herein may be implemented in other embodiments without departing from the spirit and scope of the present invention in relation to one embodiment. It also should be understood that the position or arrangement of the individual components in each disclosed embodiment may be varied without departing from the spirit and scope of the present invention. Therefore, the following detailed description is not to be taken in a limiting sense, and if properly explained, the scope of the invention is to be limited only by the appended claims, along with the full scope of equivalents to which such claims are entitled. In the drawings, like reference numerals refer to the same or similar functions throughout the several aspects, and length and area, thickness, and the like, and their shapes may be exaggerated for convenience.

Hereinafter, embodiments of the present invention will be described in detail with reference to the accompanying drawings in order that those skilled in the art easily carry out the present invention.

Configuration of Entire System

FIG. 1 is a view schematically showing a configuration of an overall system for providing a tactile message according to an embodiment of the present invention.

Referring to FIG. 1, the overall system for providing a tactile message according to an exemplary embodiment of the present invention includes a transmission terminal device 100, a reception terminal device 200, a communication network 300, and a server 400.

The transmission terminal device 100 and the reception terminal device 200, which are mobile communication terminal devices, are terminal devices having similar configurations and functions, and collectively refer to an electronic device that may access a mobile communication network 300 and perform voice communication, data communication, and the like. Any digital device that is portable and has a memory means and has a computing capability by mounting a microprocessor, for example, wearable devices which may be attached to the user's body, such as, smartphones, smart watches, and the like, tablets, and PDAs, may be adopted as the mobile communication terminal devices 100 and 200 according to the present invention.

The communication network 300 may be configured without its communication modes such as wired and wireless and may be configured with various communication networks such as mobile communication network, Local Area Network (LAN), Metropolitan Area Network (MAN), Wide Area Network (WAN), and the like. Preferably, the communication network 300 in the present invention is a well-known World Wide Web (WWW) or Code Division Multiple Access (CDMA), Wideband Code Division Multiple Access (WCDMA), and Global System for Mobile (GSM) communications network. Although not shown in the drawing, a base station is interposed between the mobile communication terminal devices 100 and 200 and the communication network 300 to mediate a data channel.

The server 400 provides a tactile message program or application to the mobile communication terminal device 100 and 200, obtains access information, identification information, communication information, etc. of the mobile communication terminal devices 100 and 200, and controls a part of functions of the mobile communication terminal devices 100 and 200 with reference to the same. The access information may include the login information of the user in the tactile message program, the identification information may include a device serial number (ESN), a telephone number, and the like, and the communication information may include a message signal between a sender and a receiver but is not limited thereto.

Configuration of Tactile Message Providing Device

Figure 2:
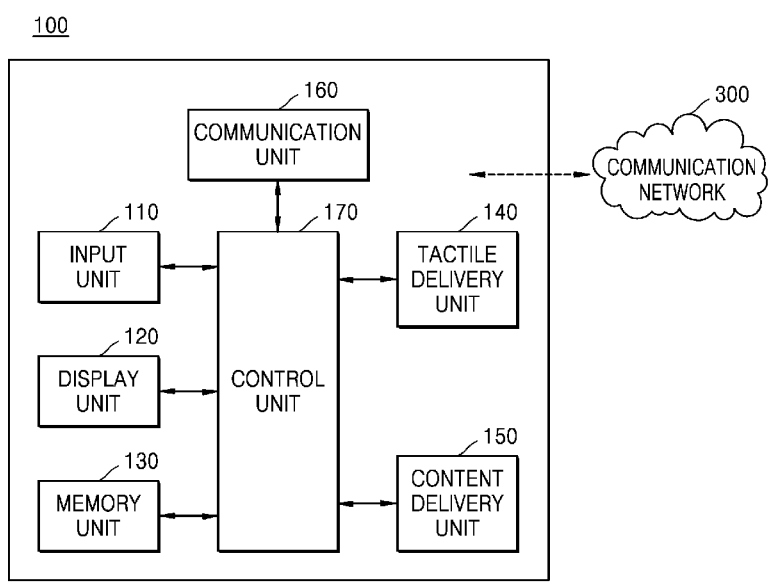
FIG. 2 is a view schematically showing a configuration of a tactile message providing device according to an embodiment of the present invention.

FIG. 2 is a view schematically showing a configuration of a tactile message providing device according to an embodiment of the present invention. It may be understood that the tactile message providing device according to the present invention includes both mobile communication terminal devices 100 and 200 themselves or a module having a function of transmitting tactile information connected to a mobile communication terminal device 100 and 200. In this specification, the tactile message providing device is assumed to be the mobile communication terminal devices 100 and 200 themselves. The tactile message providing device may be described in combination with the transmission terminal device 100 and the reception terminal device 200.

Referring to FIG. 2, the tactile message providing device 100 according to an exemplary embodiment of the present invention includes an input unit 110, a display unit 120, a memory unit 130, a tactile delivery unit 140, a content delivery unit 150, a communication unit 160, and a control unit 170.

The input unit 110 may perform a function of receiving information necessary for the operation of the tactile message providing device 100 from the user. For example, the input unit 110 may include various function keys including a touch panel, a hard key or a button, and further, may include sensing means such as an extended input means such as a mouse and a keyboard, an acceleration sensor, a gyro sensor, a gravity sensor, and a magnet sensor. In particular, in the present invention, the input unit 110 may mean input means for sending messages such as tactile, visual, and auditory, and means for inputting tactile patterns.

The display unit 120 performs a function for displaying information related to a transmission/reception message, operation guide, operation state, and the like, and for example, may include a display device such as an OLED, an LED, and an LCD. In particular, in the present invention, the display unit 120 may mean a portion for driving a driven tactile message program, a display region, and the like.

The memory unit 130 may store data necessary for operation of the tactile message providing device 100. In particular, in the present invention, a tactile message program may be installed in the memory unit 130, and a tactile pattern DB, a tactile emoticon, a user emoticon, and the like may be stored.

The tactile delivery unit 140 may convert the tactile pattern inputted by the sender into tactile information and transmit the tactile sense to the receiver. A detailed description of the tactile delivery unit 140 will be given later.

The content delivery unit 150 may perform a function of transmitting information other than information that may be visually transmitted through the display unit 120. For example, it may include a speaker that transmits auditory information such as sounds and sound effects, a means that transmits smell information, and the like.

The communication unit 160 functions to enable data transmission/reception from/to the tactile message providing device 100. In particular, in the present invention, the communication unit 160 performs a function of transmitting a pattern signal to another terminal device 200, transmitting and receiving message information, and receiving information on control of the tactile message providing device 100 from the server 400 through the communication network 300.

The control unit 170 performs a series of functions to control the flow of signals between the input unit 110, the display unit 120, the memory unit 130, the tactile delivery unit 140, the content delivery unit 150, and the communication unit 160. In particular, in the present invention, the control unit 170 may perform a function of digitizing the tactile pattern inputted through the input unit 110 into a pattern signal, transmitting the pattern signal to the communication unit 160, and transmitting it to the terminal device 200.

Configuration of Tactile Delivery Unit

Hereinafter, the configuration and various embodiments of the tactile delivery unit 140 will be described in detail.

Figure 3:
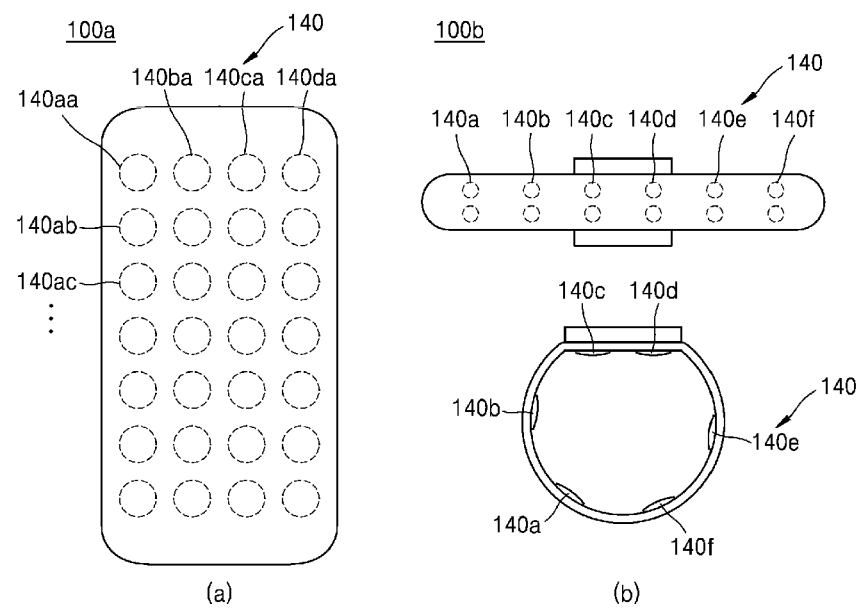
FIG. 3 is a schematic view of a mobile communication terminal device having a tactile delivery unit according to an embodiment of the present invention.

FIG. 3 is a schematic view of mobile communication terminal devices 100a and 100b having a tactile delivery unit 140 according to an embodiment of the present invention. (a) of FIG. 3 shows an embodiment in which a tactile delivery unit 140 is disposed on the rear surface of the smartphone 100a. (b) of FIG. 3 shows an embodiment in which a tactile delivery unit 140 is provided on the band inner circumferential surface of the smart watch 100b. In addition, the arrangement, location, number, size, etc. of the tactile delivery unit 140 may be modified without limitation and within a purpose range of providing tactile information in contact with a part of the user, it is noted that there is no restriction on the shape of the tactile delivery unit 140.

Referring to (a) of FIG. 3, a plurality of tactile delivery units 140 may be disposed on the rear surface of the smartphone 100a. For example, the tactile delivery unit 140 may be arranged in a matrix. Reference numerals are shown in order of 140aa, 140ba, 140ca, . . . in the row direction, and 140aa, 140ab, 140ac, . . . , in the column direction. Referring to (b) of FIG. 3, a plurality of tactile delivery units 140 may be disposed on the inner circumferential surface of the band of the smart watch 100b. For example, the tactile delivery unit 140 may be arranged at regular intervals along the band direction. Reference numerals are indicated in the order of 140a, 140b, . . . , 140f from one end of the band to the other end.

Each tactile delivery unit 140 may operate independently, and the intensity, type, delivery time, etc. of the tactile sense may be independently controlled according to the tactile pattern.

Figure 4:
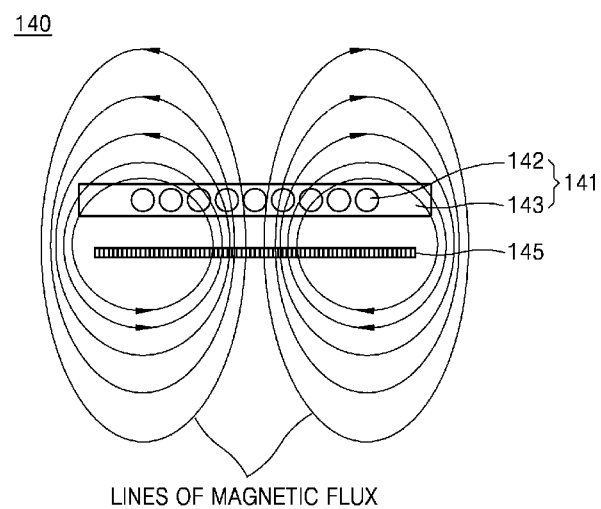
FIG. 4 is a view showing a schematic configuration of a tactile delivery unit according to an embodiment of the present invention.

FIG. 4 is a view showing a schematic configuration of a tactile delivery unit 140 according to an embodiment of the present invention.

Referring to FIG. 4, the tactile delivery unit 140 includes a tactile unit 141 composed of magnetic particles 142 and a matrix material 143, and a magnetic field generation unit 145 for applying a magnetic field to the tactile unit 141.

The tactile unit 141:141a-141e is made of magnetic material 142, for example, nano or micron sized iron or ferrite particles, and a matrix material 143, for example, rubber or other polymeric material. Also, the tactile unit 141 may be a Magneto-Rheological Elastomer (MRE), and the MRE is an elastomeric material containing particles capable of reacting to an external magnetic field. Since the MRE contains magnetic particles that may be magnetized by an external magnetic field in the elastomeric material, characteristics such as stiffness, tensile strength and elongation may be changed by application of an external magnetic field. In addition, the tactile unit 141 may be formed by selecting at least one of a polygonal phenomenon such as a micro projection, a hollow cylinder, a dome, a plate shape, a seesaw shape, or a tunnel shape.

The magnetic field generation unit 145 is located above or below the tactile unit 141 to form a magnetic field and the magnetic particle 142 in the tactile unit 141 reacts to this magnetic field. Also, the magnetic field generation unit 145 uses at least one of a plane coil or a solenoid coil. When an alternating current is applied in a size and shape corresponding to the tactile unit 141, an alternating magnetic field is generated and when a direct current is applied, a direct current magnetic field is generated. In particular, lines of magnetic flux of the magnetic field generated by the magnetic field generation unit 145 are schematically shown in FIG. 4.

Further, the magnetic field generation unit 145 has a position and a shape corresponding to the tactile unit 141, and the shape of the tactile unit 141 changes due to the magnetic field generated by the magnetic field generation unit 145, and the tactile information may be transmitted according to the shape change of the tactile unit 141. Here, the tactile information may be at least one of vibration, squeeze, tighten, slap, push, tap, tilt, and tickle. Tactile information should be understood to mean sensibility, emotion, etc. [for example, by conveying the tactile feeling of "I love you" through the touch of "♡" type, or conveying the tactile feeling of "sad" through the touch of "ㅠㅠ" style] transmitted through tactile feeling.

Meanwhile, the tactile delivery unit 140 may be a motor or an actuator for transmitting tactile information by generating vibration or the like. Specifically, the tactile delivery unit 140 may use a tube-shaped actuator including an eccentric motor that vibrates with an eccentric force generated when the motor rotates, and a linear resonance actuator that maximizes the intensity of vibration using the resonance frequency. Also, the tactile delivery unit 140 may use a piezoelectric actuator having a beam shape or a disk shape and driven by using a piezoelectric element whose size or shape is instantaneously changed by an electric field, an electroactive polymer actuator that attaches a mass onto an electroactive polymer film to produce vibrations by repeated movement of the mass, and an electrostatic actuator driven by a repulsive force generated when charges of the same kind as the attractive force generated between two glass surfaces filled with different electric charges are charged. Since the motor or the actuator is a known technology, a detailed description thereof will be omitted.

Figure 5:
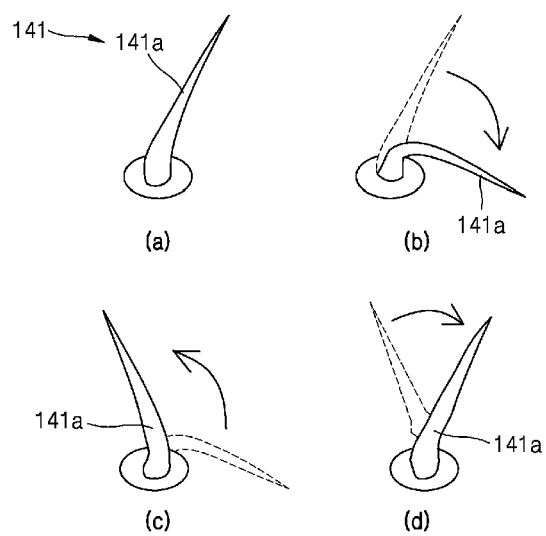
FIG. 5 is a view showing a tactile delivery unit according to the first embodiment of the present invention.

FIG. 5 is a view showing the tactile delivery unit 140 according to the first embodiment of the present invention.

Referring to FIG. 5, the tactile unit 141 of the tactile delivery unit 140 according to the first embodiment may have the shape of a fine protrusion 141a. In order to convey the tactile feeling in detail and emotionally, the fine protrusion 141a may have a thickness of about 25 μm or less so as to be similar to fleece or the like, or about 100 μm or less so as to be similar to human hair or the like.

As shown in (a) of FIG. 5, the fine protrusion 141a may maintain a slightly inclined shape (first shape) when it is not affected by the external magnetic field. Of course, it is also possible to have a fine protrusion shape erected vertically without tilting. Next, as shown in (b) of FIG. 5, in the case of being influenced by an external magnetic field, the fine protrusions 141a may be more inclined or maintain a lying shape (second shape). Next, as shown in (c) and (d) of FIG. 5, when the application of the magnetic field is released and is not affected by the external magnetic field, the fine protrusions 141a may be reciprocated by their own elasticity (or resilience) while returning from the second shape to the first shape. Therefore, a tactile feeling of rubbing or tickling may be transmitted by the reciprocating fine protrusion 141a.

Figure 6:
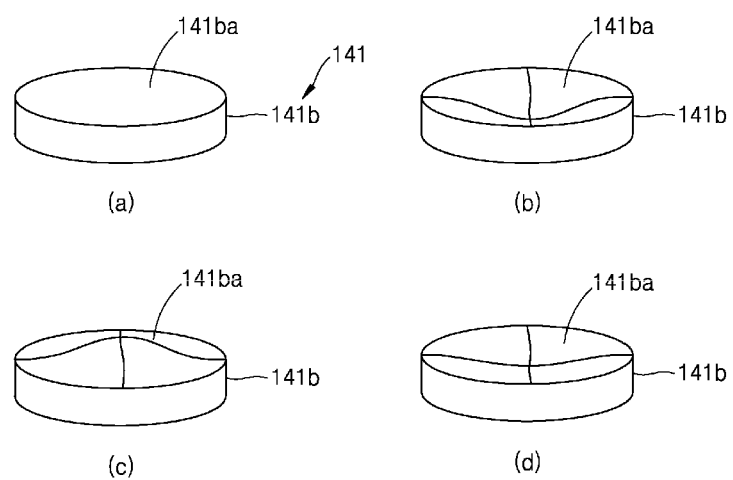
FIG. 6 is a view showing a tactile delivery unit according to the second embodiment of the present invention.

FIG. 6 is a view showing the tactile delivery unit 140 according to the second embodiment of the present invention.

Referring to FIG. 6, the tactile unit 141 of the tactile delivery unit 140 according to the second embodiment includes a hollow cylindrical body 141b, a dome or a polyhedron (see (b) of FIG. 7).

As shown in (a) of FIG. 6, in a case where it is not affected by the external magnetic field, the cylinder 141b in which the inside is hollow may exhibit a flat shape (first shape) of the upper surface 141ba. Next, as shown in (b) of FIG. 6, in the case of being influenced by an external magnetic field, the cylinder 141b may show a shape (second shape) in which the upper surface 141ba is recessed into an empty space. Next, as shown in (c) and (d) of FIG. 6, when the application of the magnetic field is released and is not affected by the external magnetic field, in relation to the cylinder 141b, the upper surface 141ba may be reciprocated by their own elasticity (or resilience) while returning from the second shape to the first shape. Therefore, the tactile feeling and the vibrating tactile feeling may be transmitted by the reciprocating upper surface 141ba.

By controlling at least one of the intensity, direction, or frequency of the magnetic field formed by the magnetic field generation unit 145, it may control at least one of the intensity (size), direction, or frequency of the transformation from the first shape to the second shape. As an example, if a stronger magnetic field is applied, since the degree of deformation of the tactile unit 141 will increase, a stronger tactile feeling may be delivered. In addition, for example, if the frequency of the magnetic field is varied, the speed at which the tactile unit 141 returns to the first shape, the second shape, and then the first shape changes, so that various tactile feelings may be delivered.

FIG. 7 is a view showing various shapes of a tactile delivery unit 140 according to an embodiment of the present invention.

(1) (a) of FIG. 7 is a hollow cylinder; (2) (b) of FIG. 7 is a hexahedron having an empty interior; and (3) (c) of FIG. 7 is a cylinder formed on the upper surface and empty inside. The air may flow smoothly through the micro hole during the reciprocating motion of the upper surface, thereby increasing the durability of the tactile unit 141. (4) (d) of FIG. 7 shows a shape obtained by mixing a fine protrusion and an empty cylinder, (5) (e) of FIG. 7 shows a shape in which a plurality of micro holes are formed on the cylinder upper surface in addition to the shape of (d) of FIG. 7, (6) (f) of FIG. 7 shows a shape having a plurality of micro holes in (c) of FIG. 7, (7) (g) of FIG. 7 shows a shape in which various structures [for example, a cylinder smaller than the cylinder and an empty cylinder inside] are combined on the upper surface of the cylinder, and (8) (h) of FIG. 7 shows a shape in which an embossed structure in the form of a dome is formed on the upper surface of a cylinder having an empty interior.

As above, by configuring the shape of the tactile delivery unit 140 in various ways, the present invention may transmit a variety of tactile feelings such as a squeeze, a tickle force, a tapping and the like in a complex manner.

FIG. 8 is a view showing a tactile delivery unit 140 according to a third embodiment of the present invention, and FIG. 9 is a view showing a tactile delivery unit 140 according to a fourth embodiment of the present invention.

Referring to FIGS. 8 and 9, in relation to the tactile unit 141 according to the third and fourth embodiments, the plurality of tactile units 141c and 141d and the support members 141ca and 141da form at least one cell. A plurality of the cells are disposed on the insulator 144 at regular intervals. The coil unit of the plurality of magnetic field generation units 145 may be formed as a single layer or a plurality of layers 145a and 145b in a shape and position corresponding to the cell below the insulator 144.

Here, the support members 141ca and 141da [see FIGS. 8 and 9] are further provided between the tactile units 141c and 141d and the magnetic field generation unit 145, so that it may be understood that the operation space of the tactile units 141c and 141d may be secured. In addition, the support members 141ca and 141da are MREs, and may have at least one shape of a curved shape or a wavy shape.

The tactile unit 141c according to the third embodiment is in the form of a plate and the support member 141ca is integrally provided on both sides of the tactile unit 141c in a curved shape. The support member 141ca is provided between the insulator 144 and the tactile unit 141c to secure a space in which the tactile unit 141c or the support member 141ca may operate. For example, the tactile unit 141c and the support member 141ca move upward and downward in the space by the magnetic field generated by the magnetic field generation unit 145, and perform a reciprocating motion to change the shape. This shape change may move one cell or the entire cell, and as a result, the user may convey various tactile feelings such as vibration, beating, and tapping.

The tactile unit 141d according to the fourth embodiment is in the form of a plate and the support member 141da is integrally provided on both sides of the tactile unit 141d in a wavy shape. The support member 141da is provided between the insulator 144 and the tactile unit 141d to secure a space in which the tactile unit 141d may operate. For example, when a magnetic field is generated by the magnetic field generation unit 145, the shape of the support member 141da formed by the MRE changes, and one end of the tactile unit 141d is inclined toward the center of the magnetic field generation unit 145. If no magnetic field is generated in the magnetic field generation unit 145, it is possible to return to the circular shape by the elastic force. That is, by applying a magnetic field to one or all of the cells, the user may transmit various tactile feelings such as vibration, beating, tapping, or tilting.

Figure 10:
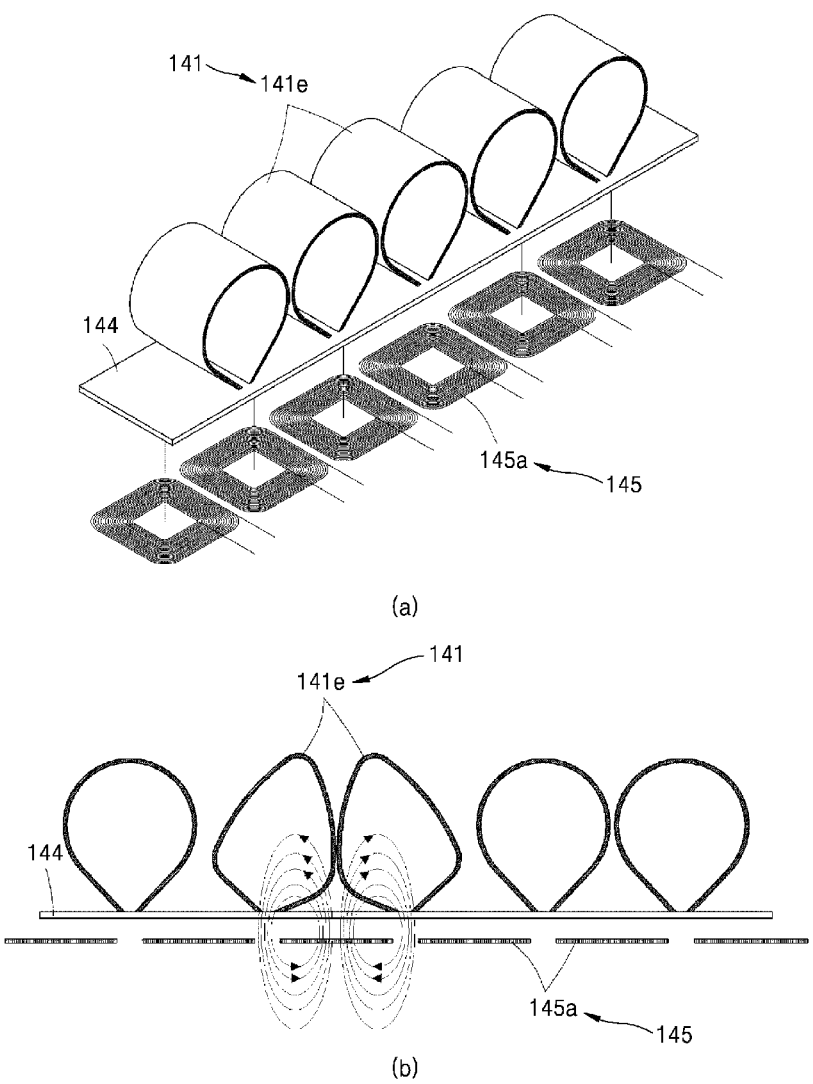
FIG. 10 is a view showing a tactile delivery unit according to the fifth embodiment of the present invention.

FIG. 10 is a view showing the tactile delivery unit 140 according to the fifth embodiment of the present invention.

Referring to FIG. 10, in relation to the tactile unit 141 according to the fifth embodiment, the plurality of tactile units 141e form at least one cell. A plurality of the cells are disposed on the insulator 144 at regular intervals. The coil unit of a plurality of magnetic field generation units 145 may be formed as a single layer 145a or a plurality of layers below the insulator 144 in a shape and position corresponding to the cell.

The tactile unit 141e according to the fifth embodiment is in the form of a tunnel, and an elliptical space is formed therein. For example, when a magnetic field is generated by the magnetic field generation unit 145, the shape of the tactile unit 141e formed by the MRE changes, and one end of the tactile unit 141e is inclined toward the center of the magnetic field generation unit 145. If no magnetic field is generated in the magnetic field generation unit 145, it is possible to return to the circular shape by the elastic force. That is, by applying a magnetic field to one or all of the cells, it is possible to transmit various tactile feelings to the user, such as twisting or tightening.

Meanwhile, although the present invention has been described on the assumption that the material including the magnetic particles 142, typically MRE, is used as the tactile delivery unit 140, Electro-Rheological Elastomer (ERE) material is used, and by applying an external electric field through the electric field generating unit instead of the magnetic field generation unit 145, it is noted that the same implementation is possible.

As described above, the present invention is capable of delivering various tactile feelings more sensitively through various tactile delivery units 140.

Tactile Message Providing Method

Hereinafter, a method of providing a tactile message through a tactile message providing device and a system including the same will be described in detail.

Figure 11:
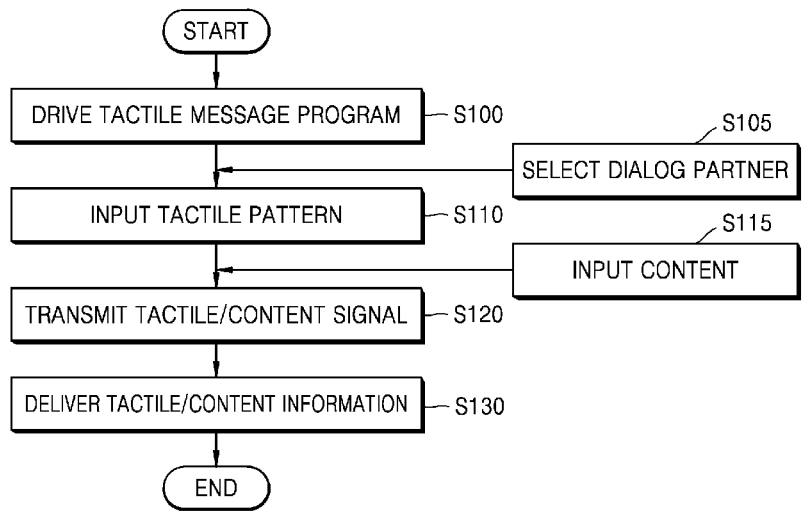
FIG. 11 is a flowchart showing a tactile message transmission process according to an embodiment of the present invention.
Figure 12:
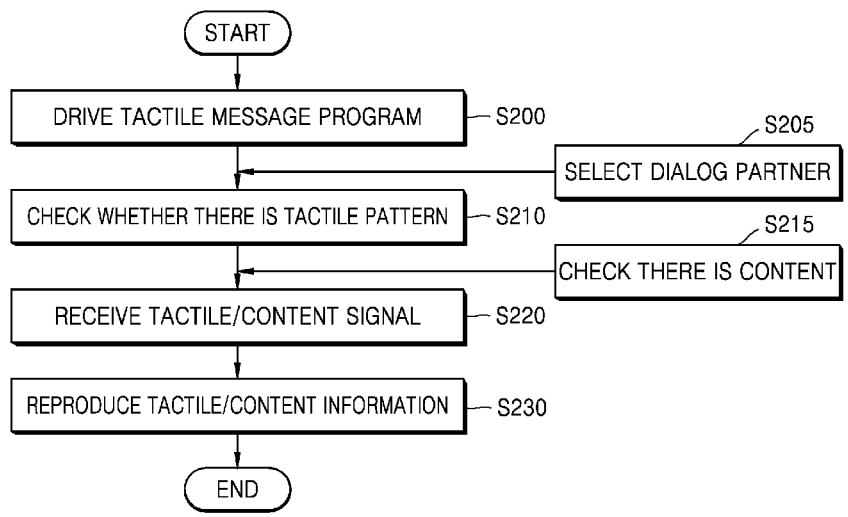
FIG. 12 is a flowchart showing a tactile message reception process according to an embodiment of the present invention.

FIG. 11 is a flowchart showing a tactile message transmission process according to an embodiment of the present invention. FIG. 12 is a flowchart showing a tactile message reception process according to an embodiment of the present invention.

A tactile message providing method for transmitting a tactile sense in a mobile communication terminal device according to the present invention includes: (a) driving a tactile message program; (b) receiving a tactile pattern; (c) converting the tactile pattern into a pattern signal; and (d) transmitting the pattern signal to a reception terminal device. And, the tactile message program includes a tactile pattern input window or a tactile switch icon for switching a text input window to a tactile pattern input window. The pattern signal is a signal capable of transmitting tactile information by operating a tactile delivery unit of a reception terminal device.

As a first step, the tactile message program may be operated (S100, S200). The sender may prepare a tactile message to be sent by driving the tactile message program on the transmission terminal device 100 (S100) and the receiver may check the received tactile message by driving the tactile message program on the reception terminal device 200 (S200). At this time, the tactile message on the reception terminal device 200 may be confirmed by driving the tactile message program, or may immediately confirm the tactile message in the form of push or notification.

Figure 13:
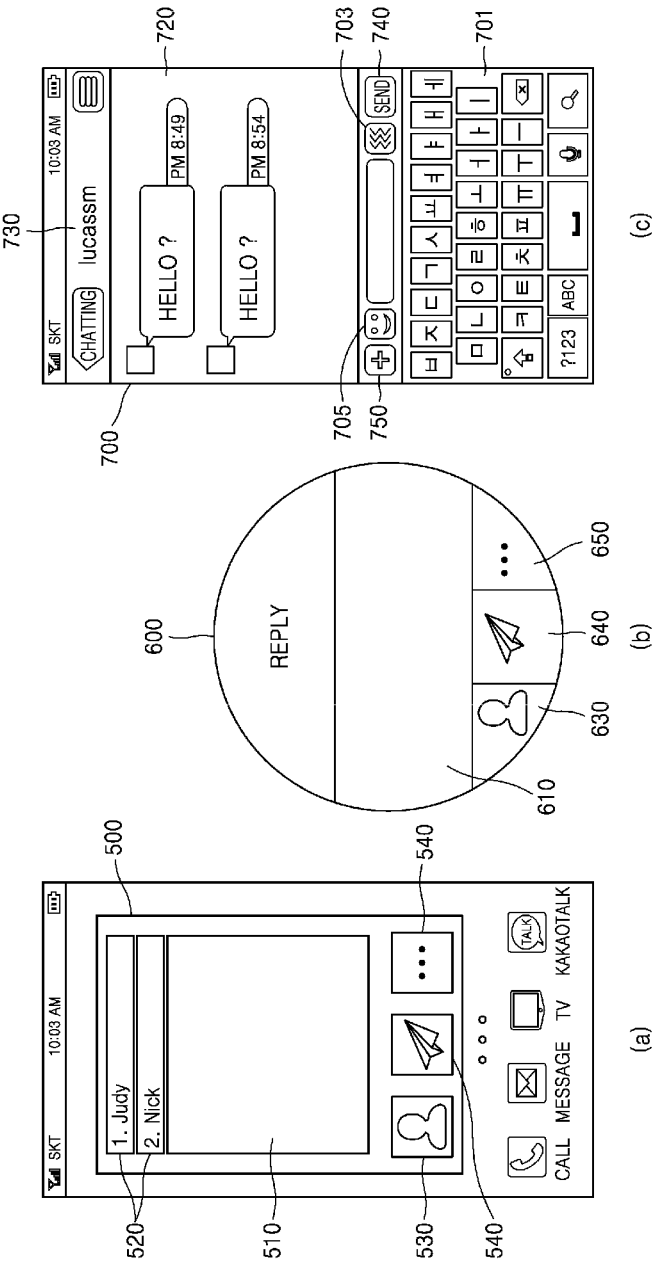
FIG. 13 is a view showing a screen of a tactile message program according to an embodiment of the present invention.

FIG. 13 is a view schematically showing screens 500, 600, and 700 of a tactile message program according to an embodiment of the present invention.

The tactile message program may be a widget, a pop-up program, an app, a messenger app, a short message service (SMS), or a multimedia message service (MMS) itself, or may be a program included additionally. (a) of FIG. 13 shows a widget and a pop-up program in a smartphone. (b) of FIG. 13 shows an app form in the smart watch. (c) of FIG. 13 shows that the tactile message program is activated in the form of a messenger app in the smartphone.

Referring to FIG. 13, the tactile message program includes input windows 510, 610 and 710 for inputting tactile patterns, dialog partner selection windows 530, 630 and 730, message transmission windows 540, 640 and 740, and an other menu window 550, 650 and 750. Also, selectively, it may further include a favorites window 520, a dialog window 720, and the like. For the Messenger app, since text message transmission/reception is basic, it may further include a text input window 701 and an emoticon input icon 705. It may further include a tactile switch icon 703 for switching the text input window 701 to the tactile pattern input window 710 [see (c) of FIG. 14].

The tactile message program may be driven through one of methods of pressing the hard key or button of the mobile communication terminal devices 100 and 200, touching the display, and rotating or shaking mobile communication terminal devices 100 and 200.

Figure 14:
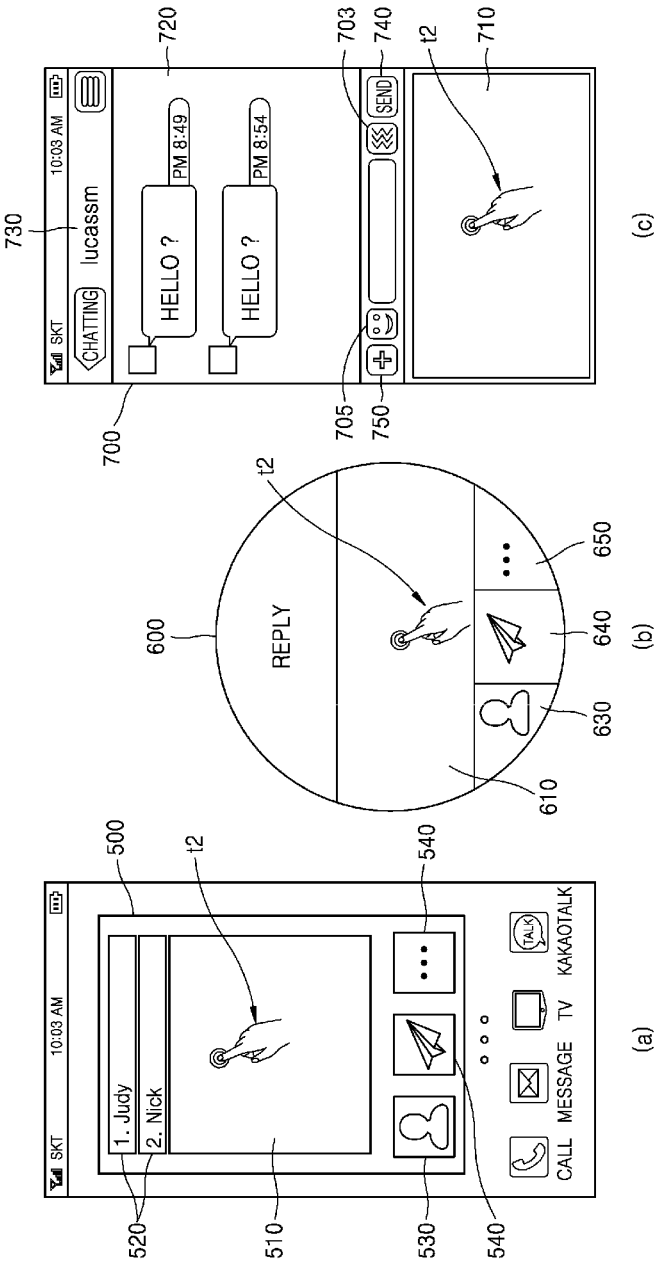
FIG. 14 is a view showing a tactile pattern input window according to an embodiment of the present invention.

FIG. 14 is a view showing tactile pattern input windows 510, 610, and 710 according to an embodiment of the present invention.

In the next step, a tactile pattern may be inputted (S110). The input of the tactile pattern is performed through ① a method of inputting freely, ② a method of inputting using a symbol S, ③ a method of selecting a tactile emoticon 706, and ④ a method of selecting a user emoticon 707, in the input windows 510, 610, and 710, by a user.

On the other hand, after driving the tactile message program, the dialog partner may be selected before inputting the tactile pattern (S105). As a dialog partner is selected by touching the dialog partner selection windows 530, 630, and 730 in the screens 500, 600, and 700 of the tactile message program, a dialog window may be opened, and a tactile pattern may be inputted through the input windows 510, 610, and 710.

Figure 15:
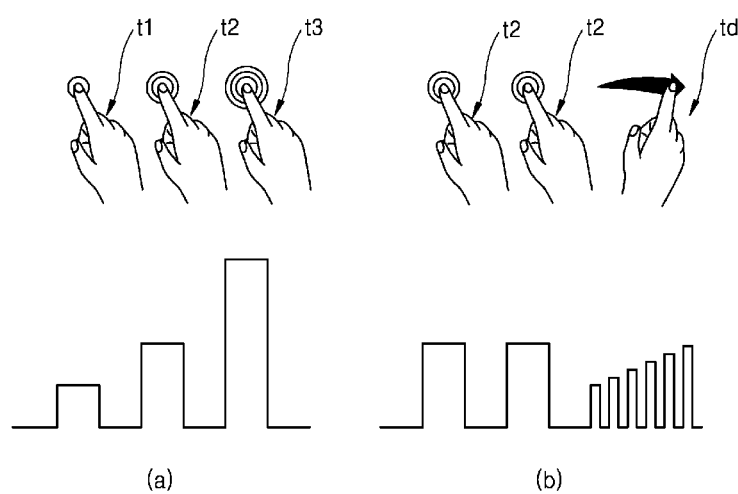
FIG. 15 is a view showing a pattern signal for a tactile pattern according to an embodiment of the present invention.

FIG. 15 is a view showing a pattern signal for a tactile pattern according to an embodiment of the present invention.

Referring to (a) of FIG. 15, for example, if the input unit 110 of the tactile message providing device 100 is an electrostatic touch panel, since the distances between the electrodes vary depending on the intensity (t1<t2<t3) of tapping or touching the input windows 510, 610, and 710, it is possible to generate electric fields of different intensities, and thus digital signals of different intensities may be generated. The number of circles in the touched portion shown in (a) of FIG. 15 represents the intensity of the touch. Then, as shown in (b) of FIG. 15, in the case of dragging td without hitting the input windows 510, 610, and 710, a digital signal of a different pattern may be generated.

Referring again to FIG. 14, through ① the method, the user may freely input the tactile pattern through the touch t: t2 of the input windows 510, 610, and 710. Hereinafter, the tactile message program is assumed to be the messenger application 700, and the tactile pattern is inputted through the input window 710.

The tactile pattern may be generated by a combination of intensity, position, time, and movement direction of the tactile pattern input window 710 in the tactile message program. A digital signal may be generated independently of each unit pixel or unit area constituting the tactile pattern input window 710. Thus, a pattern signal may be constituted by a sum of digital signals in each area.

For example, when the input window 710 is tapped more and more strongly (t1→t2→t3), each digital signal having an intensity of 1, 2, and 3 is generated, and these digital signals may be combined to form a pattern signal. This pattern signal may be a signal for driving the tactile delivery unit 140 to cause the tactile delivery unit 140 to transmit a tactile sense such that it has an intensity of 1, 2, and 3.

As another example, when touching the input window 710 by dragging from the left side to the right side td, a digital signal is generated independently from each unit area distributed from the left to the right of the input window 710, and these digital signals may be combined to form a pattern signal. This pattern signal becomes a signal to drive the tactile delivery unit 140, and the tactile delivery units are driven from the tactile delivery unit 140 disposed on the left side to the tactile delivery unit 140 disposed on the right side, so that tactile senses may be transmitted.

That is, identically to the tactile pattern input by the user in the input window 710, or within a degree in which the tactile pattern may be intuitively recognized, the tactile delivery unit 140 is driven to transmit the tactile sense in real time.

On the other hand, the tactile message program may store the tactile pattern DB in advance. When the user inputs a tactile pattern, the control unit 170 matches the input tactile pattern with the tactile patterns in the tactile pattern DB. If the same or similar tactile pattern is previously stored in the tactile pattern DB, a previously stored pattern signal may be transmitted.

Figure 16:
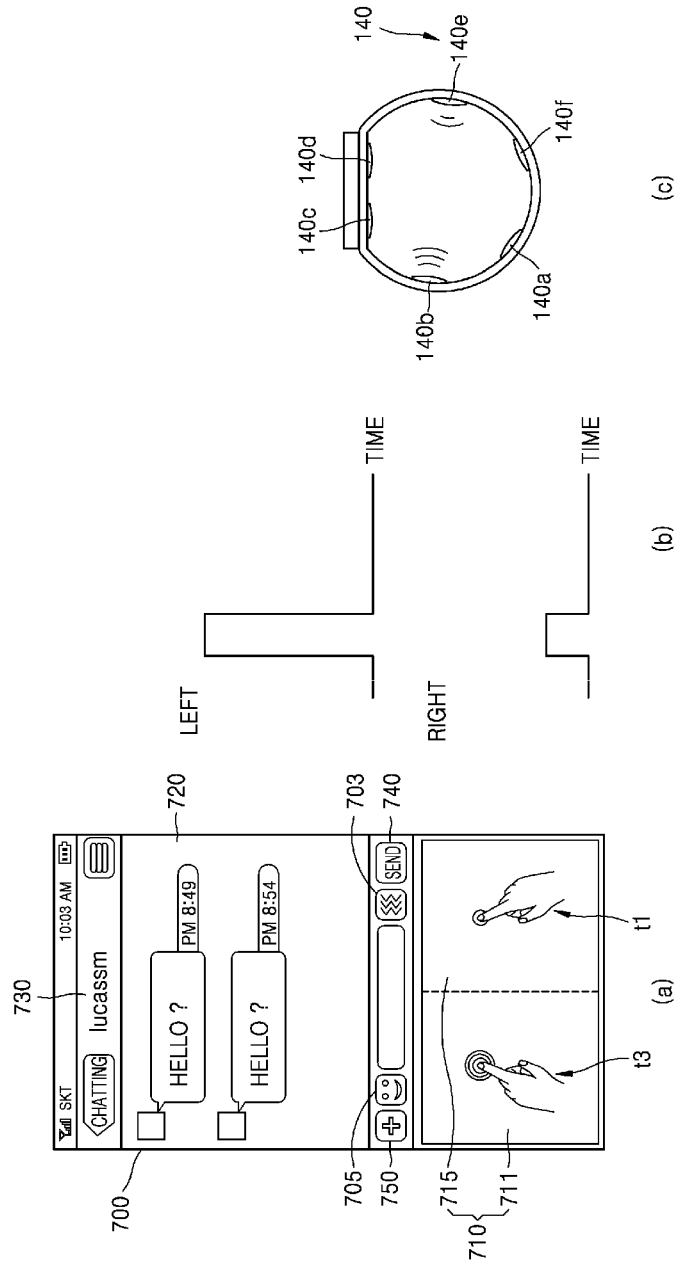
FIGS. 16 and 17 are views showing that a tactile pattern input window 710 according to an embodiment of the present invention is divided into a plurality of virtual regions to receive a tactile pattern.
Figure 17:
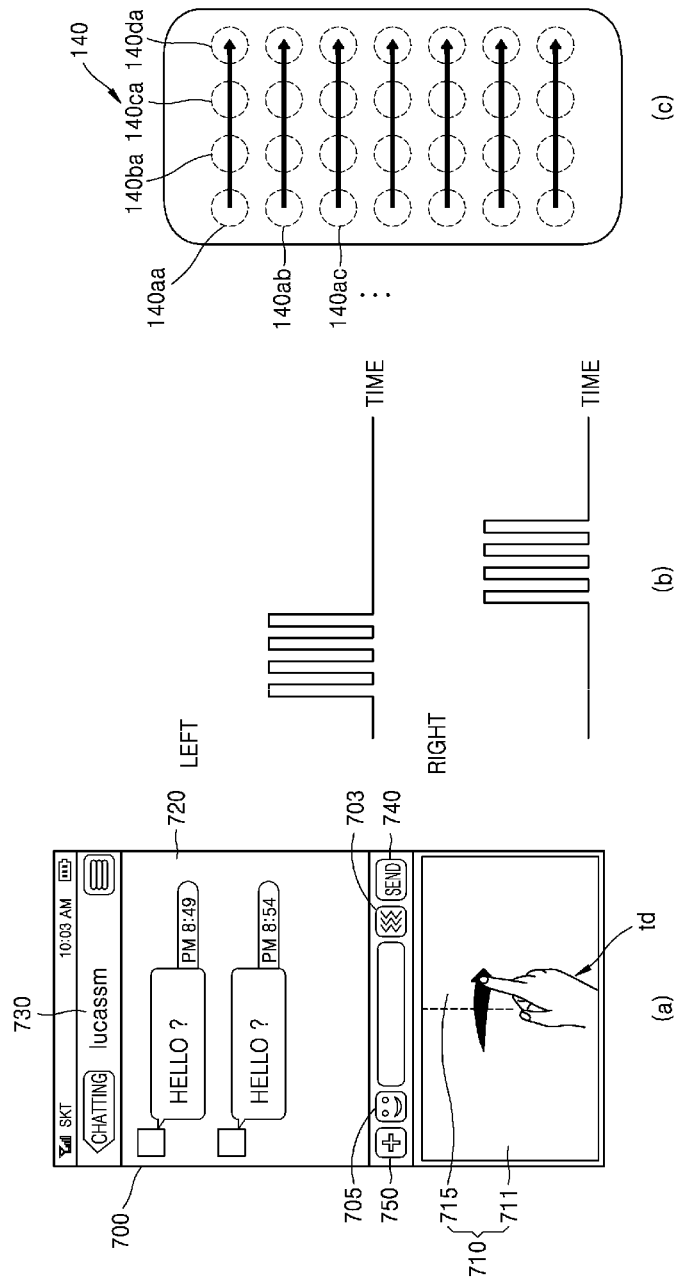

FIGS. 16 and 17 are views showing that a tactile pattern input window 710 according to an embodiment of the present invention is divided into a plurality of virtual regions 711 and 715 to receive a tactile pattern.

The tactile pattern input window 710 may be divided into a plurality of virtual regions 711 and 715. FIGS. 16 and 17 show that it is separated into two virtual regions 711 and 715, but it is not limited thereto. Preferably, the number of virtual regions 711 and 715 may be the same as the number of tactile delivery units 140, or may be divided into a number that may be mutually matched. Then, it is also possible for the user to directly specify the number, position, etc. of the virtual regions 711 and 715 and divide them.

As shown in (a) of FIG. 16, when a tactile pattern is inputted by touching t3 with strong intensity in the left area 711 and touching t1 with a weak intensity in the right area 715, as shown in (b) of FIG. 16, a digital signal is generated independently from each of the two virtual regions 711 and 715, and these digital signals may be combined to form a pattern signal. This pattern signal becomes a signal to drive the tactile delivery unit 140, and, as shown in (c) of FIG. 16, drives the tactile delivery unit 140 disposed on the left side to have a strong intensity and drives the tactile delivery unit 140 disposed on the right side to have a weak intensity. Therefore, a tactile message receiver wearing a smart watch may receive stereoscopic tactile information from the left and right wrists.

As shown in (a) of FIG. 17, when a tactile pattern is inputted by dragging td from the left area 711 to the right area 715, as shown in (b) of FIG. 17, a digital signal is generated independently from each of the two virtual regions 711 and 715, and these digital signals may be combined to form a pattern signal. This pattern signal becomes a signal to drive the tactile delivery unit 140, and as shown in (c) of FIG. 17, may sequentially drive tactile delivery units 140 from the tactile delivery units 140aa, 140ab, 140ac, . . . arranged in the left column toward the direction of the tactile delivery unit 140ca, 140cb, 140cc, . . . arranged in the right column. Therefore, a tactile message receiver holding a smartphone may receive tactile information flowing from left to right like a wave. If wearing a smart watch, he/she will receive tactile information rotating around the wrist.

As described above, the present invention is advantageous in that the tactile pattern inputted by the user through the input window 710 may be converted into stereoscopic tactile information having directionality and transmitted.

Figure 18:
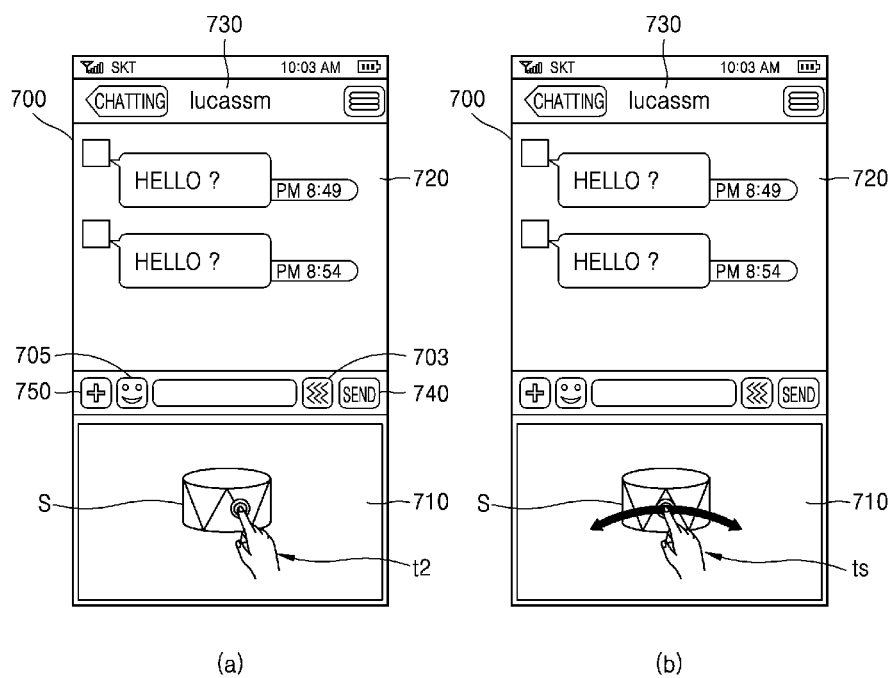
FIG. 18 is a view showing that a symbol is provided in a tactile pattern input window according to an embodiment of the present invention.

FIG. 18 is a view showing that a symbol S is provided in a tactile pattern input window 710 according to an embodiment of the present invention.

As ②, the method, the user may input a tactile pattern by touching t: t2 the symbol S displayed on the input window 710. When the tactile pattern is freely input by the method described in FIG. 14, a complicated pattern or an unclear pattern may be inputted so that it is difficult to operate the tactile delivery unit 140 in the tactile message providing device 100. In this case, the inputted tactile pattern may be deleted, or it may be troublesome to request re-input. To prevent this, a symbol S in the form of an image may be displayed on the tactile pattern input window 710.

The symbol S plays a role of attracting a user's attention and helping the user to intensively touch and drag a portion where the symbol S is displayed. The tactile pattern inputted through the portion where the symbol S is displayed may be organized in advance and provided as database in advance. Thus, the tactile message providing device 100 may generate a tactile pattern to facilitate operation of the tactile delivery unit 140.

In addition, the symbol S may generate not only a tactile pattern (pattern signal) but also generate a content signal corresponding to the symbol S. The content signal may reproduce effects such as hearing and smell. For example, as shown in FIG. 16(a), when a tactile pattern is generated and transmitted by touching a drum-shaped symbol S2, the receiver receives tactile information of tapping from the tactile delivery unit 140 and receives a drum-like sound from the content delivery unit 150 such as a speaker at the same time. Also, as shown in (b) of FIG. 16, when a tactile pattern is generated by dragging a drum-shaped symbol S in a shaking form, the receiver receives the tactile information of the knocking and vibration alternately from the tactile delivery unit 140 arranged on the left and right of the plurality of tactile delivery units 140 and receive the sound of a drum beat of a fast bit from the content delivery unit 150.

Figure 19:
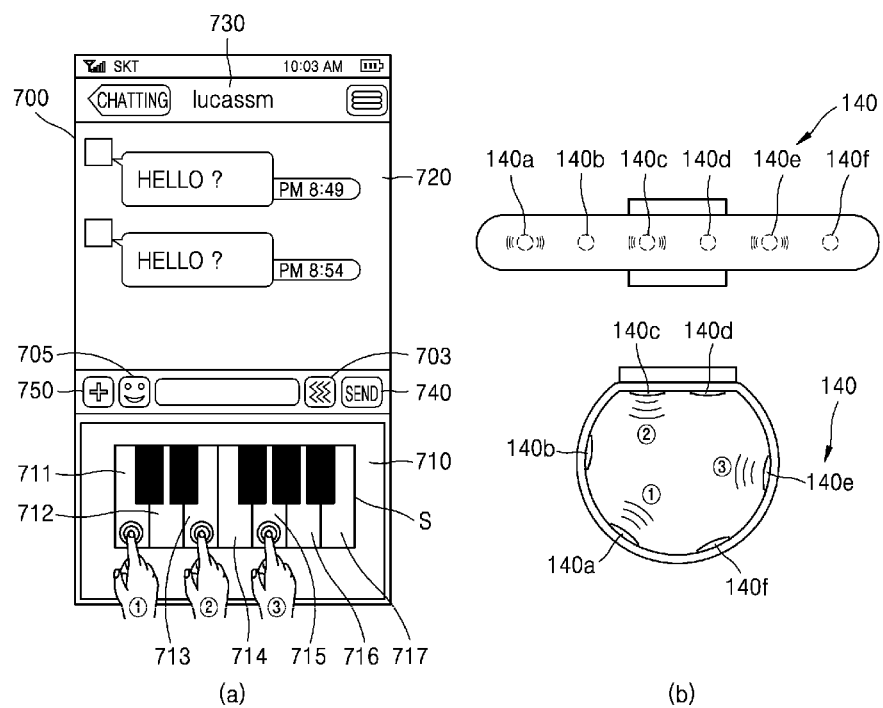
FIG. 19 is a view showing that a tactile pattern input window according to another embodiment of the present invention is divided into a plurality of virtual regions and a symbol is provided.

FIG. 19 is a view showing that a tactile pattern input window 710 according to another embodiment of the present invention is divided into a plurality of virtual regions 711 to 717 and a symbol S is provided. The embodiment of FIG. 19 may be understood as a combination of the above-described embodiments in FIGS. 16 and 18.

Each of the seven white keys in the keyboard symbol S constitutes a plurality of virtual regions 711 to 717, and each of the virtual regions 711 to 717 may be matched to tactile delivery units 140a to 140g to independently operate each of the tactile delivery units 140a to 140g. For example, if the sender touches the keyboard in the order of 711→713→715, the receiver receives tactile information in the order of 140a, 140c, and 140e. In addition, Do, Mi, and Sol corresponding to the notes of the keyboard may be provided as auditory information from the content delivery unit 150.

Figure 20:
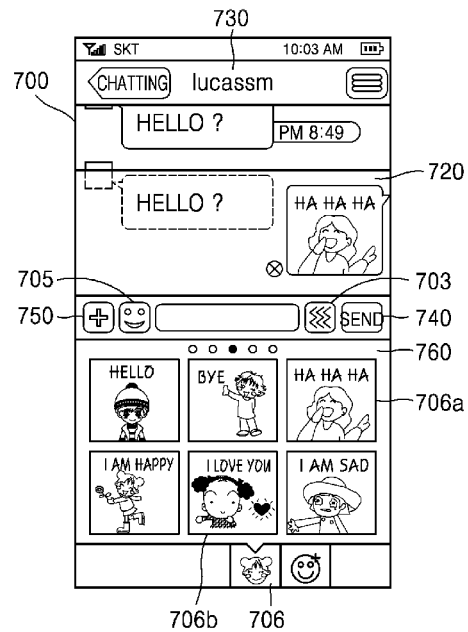
FIG. 20 is a view showing a screen for selecting a tactile emoticon according to an embodiment of the present invention.
Figure 22:
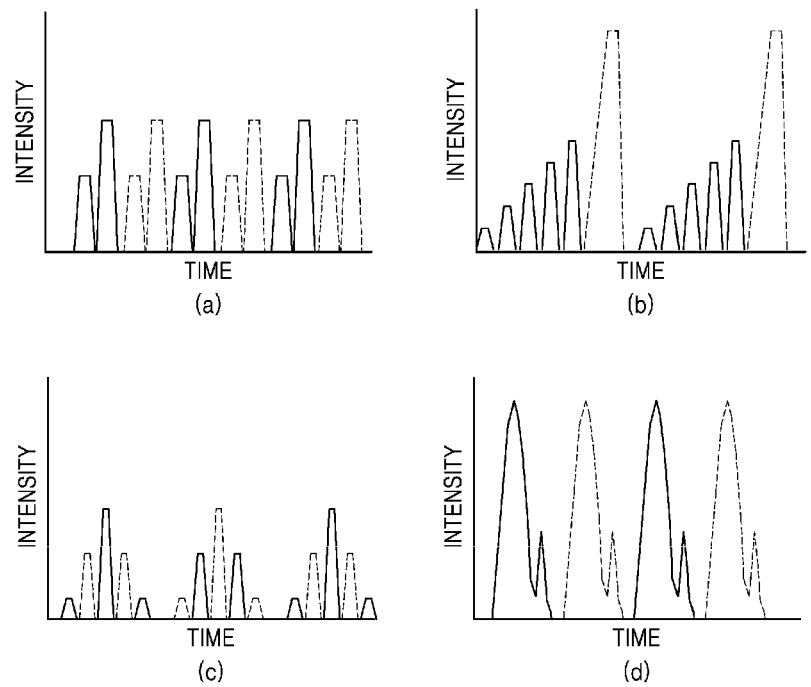
FIG. 22 is a view showing a pattern signal for various emotions according to an embodiment of the present invention.

FIG. 20 is a view showing a screen 760 for selecting a tactile emoticon 706 according to an embodiment of the present invention, and FIG. 22 is a view showing pattern signals for various emotions according to an embodiment of the present invention. In FIG. 22, it is assumed and described that the solid line pattern signal drives the left tactile delivery unit 140 among the arranged tactile delivery units 140, and the dotted line pattern signal is a pattern signal for driving the tactile delivery unit 140 on the right side.

Referring to FIG. 20, as ③ the method, a user may input a tactile pattern by selecting a tactile emoticon 706 provided in a tactile message program. The tactile emoticon 706 stores a tactile pattern corresponding to the image of the tactile emoticon 706, and when the user selects the tactile emoticon 706, the corresponding tactile pattern may be inputted.

As an example, if selecting a tactile emoticon 706a representing "hahaha", joy, and exciting, an image of the tactile emoticon 706a is displayed on and transmitted to the dialog window 720, and a pattern signal of a tactile pattern corresponding to the tactile emoticon 706a may be transmitted. (a) of FIG. 22 is an example of a pattern signal corresponding to the tactile emoticon 706a. In order to intuitively express feelings of "Ha Ha Ha", joy, and exciting, the pattern signal is configured to transmit tactile information of a feeling of jumping.

As an example, if selecting a tactile emoticon 706b representing "love you" and heart, an image of the tactile emoticon 706b is displayed on and transmitted to the dialog window 720, and a pattern signal of a tactile pattern corresponding to the tactile emoticon 706b may be transmitted. (b) of FIG. 22 is an example of a pattern signal corresponding to the tactile emoticon 706b. In order to intuitively express feelings of "love you" and heart, the pattern signal is configured to transmit tactile information of a feeling of throbbing.

Figure 21:
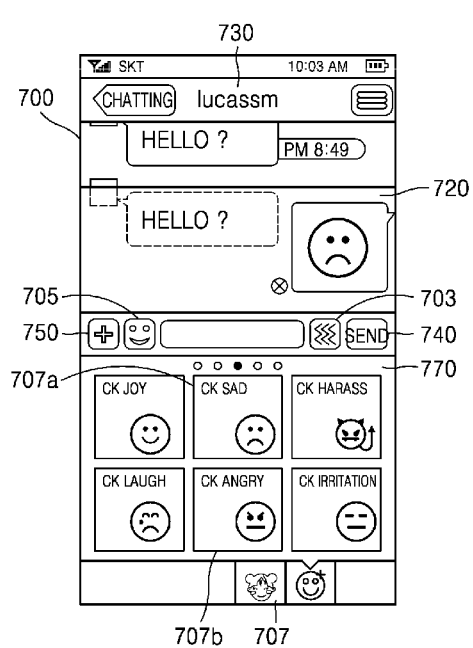
FIG. 21 is a view showing a screen for selecting a user emoticon according to an embodiment of the present invention.

FIG. 21 is a view showing a screen 770 for selecting a user emoticon 707 according to an embodiment of the present invention.

Referring to FIG. 21, as ④ the method, the user may arbitrarily create the tactile message through the tactile pattern input window 710 of the tactile message program and input the tactile pattern by selecting the user emoticon 707 which is stored in advance. The emoticon image and the corresponding tactile pattern are stored in the user emoticon 707 in combination of intensity, position, time, and direction of movement that the user touches, and when the user selects user emoticon 707, the corresponding tactile pattern may be inputted.

As an example, if selecting a tactile emoticon 707a representing "sadness", an image of the corresponding user emoticon 707a is displayed and transmitted in the dialog window 720, and a pattern signal of a tactile pattern included in the user emoticon 707a may be transmitted simultaneously. (c) of FIG. 22 is an example of a pattern signal corresponding to the user emoticon 707a. In order to intuitively express the feelings of "sadness", the pattern signal may be stored so as to transmit tactile information of a feeling of crying.

As another example, if selecting a tactile emoticon 707b representing "angry", an image of the corresponding user emoticon 707b is displayed and transmitted in the dialog window 720, and a pattern signal of a tactile pattern included in the user emoticon 707b may be transmitted simultaneously. (d) of FIG. 22 is an example of a pattern signal corresponding to the user emoticon 707b. In order to intuitively express the feelings of "angry", the pattern signal may be stored so as to transmit tactile information of a feeling of shouting suddenly.

On the other hand, the user may input a tactile pattern and receive a tactile feedback to send. In addition, the memory unit 130 may store a history of the tactile pattern, date, and dialog partner sent by the user, and may provide the user with a history.

Referring again to FIG. 11, a tactile signal (pattern signal) corresponding to the inputted tactile pattern may be transmitted (S120). The control unit 170 may encode the tactile pattern inputted through the input unit 110 as a pattern signal. The process of encoding the tactile pattern into the pattern signal is as described above with reference to FIGS.

15 to 17. The encoded pattern signal is transmitted to the communication unit 160, and the communication unit 160 may transmit the pattern signal to the communication unit of the reception terminal device 200.

The content signal may be transmitted along with the transmission of the tactile signal (pattern signal). In addition to the process of inputting the tactile pattern (S110), a process of inputting the content S115 may be further performed. The content may include dialogue text, sounds, sound effects, and the like.

In the next step, tactile information and content information may be transmitted (S130). The transmission of the tactile/content information may be performed by reproducing the tactile information and the content information through the tactile delivery unit and the content delivery unit of the reception terminal device 200. The tactile delivery unit 150 may be driven in response to a tactile signal (pattern signal) as described above with reference to FIGS. 15 to 22.

Referring again to FIG. 12, from the perspective of a receiver, a method of providing a tactile message will be described.

The reception terminal device 200 may confirm whether or not there is a tactile pattern (tactile signal) in the transmitted signal (S210). When the received signal includes only image signals such as a simple text signal, an emoticon, and a photograph, the dialog window 720 of the reception terminal device 200 may display only text and images. If it is determined that the tactile pattern (tactile signal) is included in the transmitted signal, the signal transmitted from the control unit may be recorded in the memory unit. When transmitting a message signal at the transmission terminal device 100, by transmitting only the identification code identifying that the tactile pattern (tactile signal) is contained in the message signal, the presence or absence of the tactile pattern may be checked at the reception terminal device 200.

Meanwhile, the reception terminal device 200 may confirm whether or not the content signal is included in addition to the tactile pattern (S215). If it is determined that the received signal includes a content signal (simple text, content signal such as auditory sense or olfactory signal except image), the signal received from the control unit may be recorded in the memory unit. When transmitting a message signal at the transmission terminal device 100, by transmitting only the identification code identifying that the content signal is contained in the message signal, the presence or absence of the content signal may be checked at the reception terminal device 200.

In the next step, the tactile/content signal received from the control unit is received and written to the memory unit, and the control unit prepares for processing (S220).

In the next step, the control unit may reproduce the visual information, the tactile information, and the content information including the text, image, and the like through the display unit, the tactile delivery unit, and the content delivery unit (S230).

FIG. 23 is a view showing a screen for receiving tactile messages 721, 722, and 723 according to an embodiment of the present invention. (a) of FIG. 23 shows a tactile message 721 inputted by the sender freely or using the symbol S. (b) of FIG. 23 shows a tactile message 722 transmitted by selecting the tactile emoticon 706. (c) of FIG. 23 shows a dialog window 720 in which a tactile message 723 transmitted by selecting the user emoticon 707 is displayed.

As shown in (a) of FIG. 23, the tactile information ti corresponding to the tactile signal (pattern signal) included in the tactile message 721 may be transmitted to the receiver.

Also, as shown in (b) and (c) of FIG. 23, when the tactile messages 722 and 723 simultaneously include the tactile signal (pattern signal) and the content signal, the corresponding tactile information ti and content information si may be transmitted to the receiver.

After running the tactile message program and selecting the dialog partner, by touching the tactile messages 721, 722, and 723, the receiver may receive tactile information ti and content information si. In addition, the sender may transmit tactile information ti and content information si to the receiver in the form of push and notification immediately after the sender sends the tactile message. The tactile information ti and the content information si may be received at the same time, or sequentially received at predetermined intervals. This may be changed freely through the setting of the tactile message program.

If the reception terminal device 200 of the receiver is included as a single module in which only one tactile delivery unit 140 is installed, tactile information ti such as vibration, hitting, pushing, and tapping may be received. And, when the reception terminal device 200 of the receiver includes a plurality of tactile delivery units 140 as a plurality of modules, it is possible to receive tactile information ti having directionality such as squeezing, tightening, tilting, and tickling force in addition to the form of the tactile information ti.

Meanwhile, according to another embodiment, without touching the screen of the tactile message program, the tactile pattern may be inputted. If the sender may not touch the screen of the tactile message program, for example, if a mobile phone is on the cheek, touching on the touch panel may be difficult. This is more difficult during a call when the proximity sensor is activated and the display screen is turned off.

In this case, the sender may input a tactile pattern using a method of tapping, rotating, or shaking the transmission terminal device 100. First, during the call, by pressing the hard key or button of the transmission terminal device 100, or tapping the body of the terminal device, it is possible to create a state of entering a tactile pattern. Then, if the transmission terminal device 100 is directly tapped, rotated, shaken, or brought into contact with a magnetic material, acceleration sensors, gyro sensors, gravity sensors, magnetic sensors, etc. may recognize this pattern. The control unit 170 may generate a tactile pattern by encoding this pattern. Then, the tactile information corresponding to the tactile pattern may be transmitted to the receiver.

As described above, according to the present invention, as the tactile message is transmitted through the tactile sense, it is possible to avoid limiting the expression of the user due to existing message services primarily based on visual. In addition, as promptly inputting a feeling of a sender in a tactile pattern, it is possible to transmit various tactile feeling such as vibration, squeeze, tightening, hitting, pushing, tapping, tilting, and tickling force to the receiver more sensitively, and the tactile feeling may be delivered in a form corresponding to the user's emotions. Thus, there is an effect that emotions that a user feels in various situations allows other people to feel the same feeling.

While the present invention has been particularly shown and described with reference to exemplary embodiments thereof, the present invention is not limited to the above embodiment, and within the spirit of the present invention, various changes and modifications may be made by those skilled in the art. Such variations and modifications are to be considered as falling within the scope of the invention and the appended claims.

What is claimed is:

1. A tactile message providing method in a first mobile device, the method comprising:
   driving a tactile message program in the first mobile device;
   receiving a tactile pattern in the first mobile device;
   converting the tactile pattern into a tactile signal; and
   transmitting, by the first mobile device, the tactile signal to a second mobile device,
   wherein the tactile message program comprises a tactile switch icon, and the tactile switch icon switches a text input window to a tactile pattern input window having a plurality of regions to receive the tactile pattern to generate digital signals independently from each region,
   wherein the tactile signal is a sum of the digital signals, and
   wherein the second mobile device includes a plurality of tactile delivery units, and wherein the tactile signal is a signal capable of transmitting tactile information having directionality, by operating each tactile delivery unit of the second mobile device corresponding to each of the regions of the tactile pattern input window.

2. The method of claim 1, wherein the tactile signal is configured to operate a plurality of delivery units of the second mobile device to provide one or more tactile sensations.

3. The method of claim 1, wherein the tactile information corresponds to at least one of vibration, squeeze, fasten, punch, push, tap, tilt and tickle.

4. The method of claim 1, wherein the tactile signal provides an emotional signal to provide feelings of the user of the first mobile device.

5. The method of claim 1, the method further comprising:
   detecting the tactile signal of the tactile pattern in the first mobile device.

6. The method of claim 1, wherein the tactile pattern comprises an intensity, a position, a time, and a movement direction that a sender touches the tactile pattern input window.

7. A tactile message providing device, the device comprising:
   a display unit to display a tactile message program having a tactile switch icon for switching a text input window to a tactile pattern input window having a plurality of regions to receive the tactile pattern to generate digital signals independently from each region;
   an input unit to provide a tactile pattern through the tactile pattern input window;
   a control unit to convert the tactile pattern into a tactile signal; and
   a communication unit to transmit the tactile signal to a receiving device,
   wherein the tactile signal is a sum of the digital signals, and
   wherein the receiving device includes a plurality of tactile delivery units, and wherein the tactile signal is a signal capable of transmitting tactile information having directionality, by operating each tactile delivery unit of the receiving device corresponding to each of the regions of the tactile pattern input window.

8. The device of claim 7, wherein the tactile signal is configured to operate a plurality of delivery units of the receiving device to provide one or more tactile sensations.

9. The device of claim 7, wherein the tactile information corresponds to at least one of vibration, squeeze, fasten, punch, push, tap, tilt and tickle.

10. The device of claim 7, wherein the tactile signal provides an emotional signal to provide feelings of the user of the device.

11. The device of claim 7, wherein the control unit detects the tactile signal of the tactile pattern.

12. The device of claim 7, wherein the tactile pattern comprises an intensity, a position, a time, and a movement direction that a sender touches the tactile pattern input window.

13. A non-transitory computer-readable recording medium, in which a program of a tactile message providing method executable by a processor of a first mobile device is recorded, the method comprising:
   driving a tactile message program in the first mobile device;
   receiving a tactile pattern in the first mobile device;
   converting the tactile pattern into a tactile signal; and
   transmitting, by the first mobile device, the tactile signal to a second mobile device,
   wherein the tactile message program comprises a tactile switch icon, and the tactile switch icon switches a text input window to a tactile pattern input window having a plurality of regions to receive the tactile pattern to generate digital signals independently from each region,
   wherein the tactile signal is a sum of digital signals, and
   wherein the second mobile device includes a plurality of tactile delivery units, and wherein the tactile signal is a signal capable of transmitting tactile information having directionality, by operating each tactile delivery unit of the second mobile device corresponding to each of the regions of the tactile pattern input window.

14. The non-transitory computer-readable recording medium of claim 13, wherein the tactile signal is configured to operate a plurality of delivery units of the second mobile device to provide one or more tactile sensations.

15. The non-transitory computer-readable recording medium of claim 13, wherein the tactile information corresponds to at least one of vibration, squeeze, fasten, punch, push, tap, tilt and tickle.

16. The non-transitory computer-readable recording medium of claim 13, wherein the tactile signal provides an emotional signal to provide feelings of the user of the first mobile device.

17. The non-transitory computer-readable recording medium of claim 13, wherein the tactile pattern comprises an intensity, a position, a time, and a movement direction that a sender touches the tactile pattern input window.

* * * * *